US012772055B2

(12) United States Patent
Ben-David

(10) Patent No.: US 12,772,055 B2
(45) Date of Patent: Oct. 20, 2026

(54) SIM BASED AUTHENTICATION

(71) Applicant: Unibeam Ltd., Hod-HaSharon (IL)

(72) Inventor: Ran Ben-David, Hod-HaSharon (IL)

(73) Assignee: Unibeam Ltd., Hod-HaSharon (IL)

( * ) Notice: Subject to any disclaimer, the term of this patent is extended or adjusted under 35 U.S.C. 154(b) by 0 days.

(21) Appl. No.: 19/530,544

(22) Filed: Feb. 5, 2026

(65) Prior Publication Data

US 2026/0172826 A1 Jun. 18, 2026

Related U.S. Application Data

(63) Continuation of application No. 19/234,403, filed on Jun. 11, 2025.

(60) Provisional application No. 63/718,653, filed on Nov. 10, 2024.

(51) Int. Cl.

| | |
|---|---|
| ***H04W 12/30*** | (2021.01) |
| ***H04W 12/06*** | (2021.01) |
| ***H04W 12/42*** | (2021.01) |
| ***H04W 12/43*** | (2021.01) |
| ***H04W 12/72*** | (2021.01) |
| *H04L 9/32* | (2006.01) |
| *H04L 9/40* | (2022.01) |

(52) U.S. Cl.

CPC ........... *H04W 12/30* (2021.01); *H04W 12/06* (2013.01); *H04W 12/35* (2021.01); *H04W 12/42* (2021.01); *H04W 12/43* (2021.01); *H04W 12/72* (2021.01); *H04L 9/32* (2013.01); *H04L 63/12* (2013.01)

(58) Field of Classification Search

CPC ..... H04W 12/06; H04W 12/30; H04W 12/42; H04W 12/72; H04W 12/069; H04W 12/35; H04W 12/43; H04W 12/45; H04W 12/60; H04W 12/71; H04L 9/32; H04L 9/3263; H04L 63/12

See application file for complete search history.

(56) References Cited

U.S. PATENT DOCUMENTS

| | | | | |
|---|---|---|---|---|
| 2018/0103335 | A1* | 4/2018 | Bruner | H04W 4/60 |
| 2021/0006969 | A1* | 1/2021 | Hult | H04W 8/26 |
| 2021/0136849 | A1* | 5/2021 | Nimmala | H04W 68/005 |
| 2021/0194679 | A1* | 6/2021 | Yang | H04L 9/3234 |
| 2023/0020909 | A1* | 1/2023 | Holmes | H04W 8/205 |
| 2023/0308855 | A1* | 9/2023 | Matolia | H04W 36/06 |
| 2026/0089781 | A1* | 3/2026 | Padova | H04L 41/0895 |

* cited by examiner

*Primary Examiner* — Shaqueal D Wade-Wright

(57) ABSTRACT

There is provided a mobile device for accessing a service hosted by an application server, comprising: at least one processor of a mobile device executing a code for: operating primary circuitry installed in the mobile device connected to a first cellular service provider and providing cellular data services to the mobile device, receiving a request for authentication of the mobile device from an application server, accessing a unique digital identifier stored in a secondary circuitry of the mobile device having connectivity provided by a second cellular service provider, and providing the unique digital identifier to the application server for authenticating the mobile device for accessing the service.

35 Claims, 3 Drawing Sheets

SIM BASED AUTHENTICATION

RELATED APPLICATIONS

This application is a Continuation of U.S. patent application Ser. No. 19/234,403 filed on Jun. 11, 2025 which claims the benefit of priority under 35 USC § 119(e) of U.S. Provisional Ser. No. 63/718,653 filed on Nov. 10, 2024, the contents of which are all incorporated by reference as if fully set forth herein in their entirety.

BACKGROUND

The present invention, in some embodiments thereof, relates to cybersecurity and authentication and, more specifically, but not exclusively, to systems and methods for authentication of a mobile device.

Access to network-based services requires verification of a unique identifier in order to be performed securely. For example, logging into a bank web site may be done by the user entering a password. An online purchase may be further secured by sending a one-time password (OTP) such as a PIN number to a smartphone of the user. The user enters the OTP number as a verification. In another example, a user logs into a game server to play a game using user credentials that identify the user.

SUMMARY

According to a first aspect, a mobile device for accessing a service hosted by an application server, comprises: at least one processor of a mobile device executing a code for: operating primary circuitry installed in the mobile device connected to a first cellular service provider and providing cellular data services to the mobile device, receiving a request for authentication of the mobile device from an application server, accessing a unique digital identifier stored in a secondary circuitry of the mobile device having connectivity provided by a second cellular service provider, and providing the unique digital identifier to the application server for authenticating the mobile device for accessing the service.

According to a second aspect, a method for using a mobile device for accessing a service hosted by an application server, comprises: at least one processor of a mobile device executing a code for: operating primary circuitry installed in the mobile device connected to a first cellular service provider and providing cellular data services to the mobile device, receiving a request for authentication of the mobile device from an application server, accessing unique digital identifiers stored in a secondary circuitry of the mobile device having connectivity provided by a second cellular service provider, and providing the unique digital identifiers to the application server for authenticating the mobile device for accessing the service.

According to a third aspect, a non-transitory medium storing program instructions for using a mobile device for accessing a service hosted by an application server, comprising program instructions which when executed by at least one processor, cause the at least one processor to: operate primary circuitry installed in the mobile device connected to a first cellular service provider and providing cellular data services to the mobile device, receive a request for authentication of the mobile device from an application server, access unique digital identifiers stored in a secondary circuitry of the mobile device having connectivity provided by a second cellular service provider, and provide the unique digital identifiers to the application server for authenticating the mobile device for accessing the service.

In a further implementation form of the first, second, and third aspects, the unique digital identifier stored in the secondary circuitry comprises a Mobile Station International Subscriber Directory Number (MSISDN).

In a further implementation form of the first, second, and third aspects, the primary circuitry is activated and selected for providing cellular services by the first cellular service provider, and the secondary circuitry is activated and not be selected for use by the mobile device for cellular services.

In a further implementation form of the first, second, and third aspects, the cellular services that are activated on the primary circuitry and not selected on the secondary circuitry include at least one of: voice call services, upload data services, download data services, and short message service (SMS) services.

In a further implementation form of the first, second, and third aspects, the primary circuitry is activated for providing cellular services by the first cellular service provider, and the secondary circuitry is activated for providing cellular services by the second cellular service provider.

In a further implementation form of the first, second, and third aspects, the primary circuitry comprises a subscriber identifier module (SIM) card and the secondary circuitry is configured for hosting an embedded SIM (eSIM).

In a further implementation form of the first, second, and third aspects, the primary circuitry comprises a first SIM card and the secondary circuitry comprises a second SIM card.

In a further implementation form of the first, second, and third aspects, the primary circuitry and secondary circuitry are separate components, installed in different locations in the mobile device.

In a further implementation form of the first, second, and third aspects, further comprising downloading code instructions including the unique digital identifier from a server, wherein the server provides different unique digital identifiers to different mobile devices via respective code instructions configured for installation on the different mobile devices.

In a further implementation form of the first, second, and third aspects, the primary circuitry is used for communicating with the application server and identified by the unique digital identifier assigned to the secondary circuitry.

In a further implementation form of the first, second, and third aspects, the secondary circuitry further comprises a storage component installed in the mobile device storing an applet, wherein the applet obtains device and SIM unique digital identifiers from the secondary circuitry in response to the request.

In a further implementation form of the first, second, and third aspects, the applet is downloaded in association with the unique digital identifier from a server providing different unique digital identifiers to different mobile devices.

In a further implementation form of the first, second, and third aspects, the unique identifier indicates that the mobile device is authenticated from cellular communication by the second cellular service provider, and the application server uses the unique identifier to validate that the mobile device is authenticated for cellular communication by a service provider comprising the second cellular service provider.

In a further implementation form of the first, second, and third aspects, further comprising code for: obtaining unique identifiers of hardware of the mobile device, and providing in association with the unique digital identifiers, at least one unique identifier of hardware to the application server for authentication of the mobile device.

In a further implementation form of the first, second, and third aspects, the unique identifiers of hardware include self-generated identifiers that represent the Integrated Circuity Card Identification (ICCID) or Embedded Identity Document (EID), which may denote a SIM ID and/or Embedded Mobile Equipment Identity (EMEI) which may denote a device ID.

In a further implementation form of the first, second, and third aspects, further comprising code for: executing an applet stored in a storage component of the secondary circuitry for accessing at least one unique identifier of hardware of the mobile device, wherein the applet obtains the unique identifier of hardware to provide to the application server.

In a further implementation form of the first, second, and third aspects, further comprising code for: receiving a request from the application server for registration of the mobile device, and providing the unique digital identifiers for registration of the mobile device, wherein the application server stores the unique digital identifiers in a user record, wherein the application server authenticates the mobile device by comparing the unique digital identifiers received in response to the request for authentication, to the unique digital identifiers stored in the user record.

In a further implementation form of the first, second, and third aspects, further comprising code for: receiving the request for authentication and sending the unique digital identifiers, via the secondary circuitry over a cellular network operated by the secondary cellular service provider.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
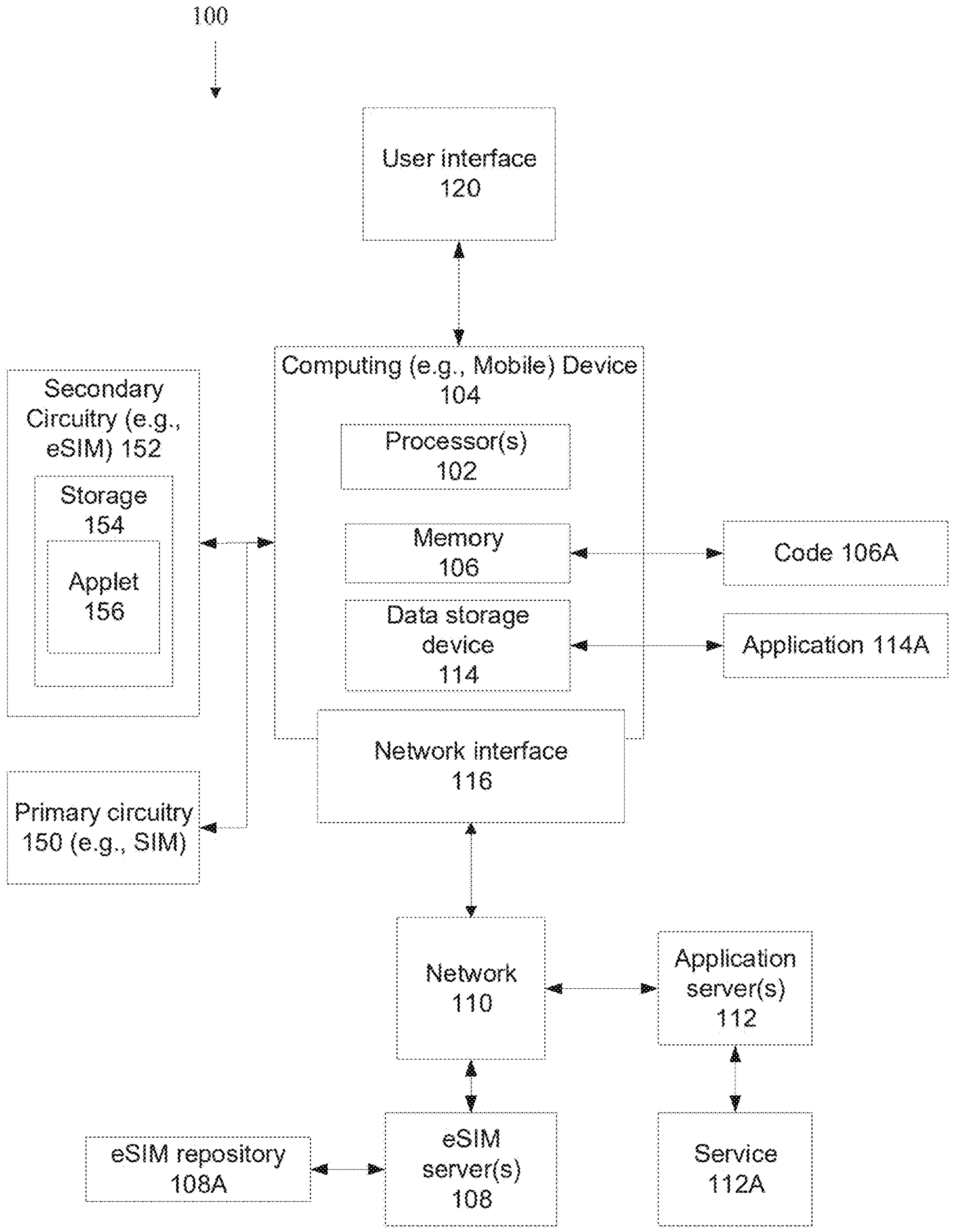
FIG. 1 is a block diagram of components of a system for authentication of a mobile device and/or a subscriber for accessing a service hosted by an application server using a secondary circuitry of a mobile device, in accordance with some embodiments of the present invention.

The present invention, in some embodiments thereof, relates to cybersecurity and authentication and, more specifically, but not exclusively, to systems and methods for authentication of a mobile device.

As used herein, the term subscriber identification module (SIM) card or SIM represents an exemplary implementation of a circuity that is used by devices for cellular communication provided by a service provider. The term SIM is used as a not necessarily limiting example, as other implementations of circuitry may be used, for example, a Universal Integrated Circuit Card (UICC). In some embodiments, the circuitry is designed to store an embedded SIM (eSIM), i.e., code instructions representing a SIM card on existing circuitry installed in the mobile device, rather than dedicated circuitry which may be external and designed to be inserted into (and optionally removed from) the mobile device. The term smart card may be sometimes used interchangeably with the term circuitry.

As used herein, the term mobile device represents an exemplary implementation of a computing device. The term mobile device is not necessarily limiting, and other devices that include circuitry (e.g., SIM card that is inserted into a slot of the mobile device, eSIM that is embedded directly into the mobile device) installed therein, may be used for accessing a service and/or a web site.

An aspect of some embodiments of the present invention relates to mobile devices, systems, methods, computing devices, and/or instructions (stored on a data storage device and executable by one or more processors) for using a secondary circuitry installed in the mobile device for authentication of the mobile device, for example, for remotely accessing a service hosted by an application server. The secondary circuitry may be designed to host an eSIM (as used herein the term secondary circuitry may refer to the eSIM. The secondary circuity has connectivity to a cellular services provider (also referred to herein as a cellular network operator). The eSIM (or SIM) of the secondary circuitry with connectivity may be referred to herein as a “live eSIM” or “live SIM”. The mobile device has installed therein a primary circuitry that has connectivity provided by a first cellular service provider, i.e., the primary circuitry is a “live SIM” (or “live eSIM”). The primary circuitry may be implemented as, for example, a SIM card. The first cellular service provider may be different than the cellular services provider of the secondary circuitry (also referred to herein as second cellular services provider).

The primary circuitry provides cellular services by the first cellular service provider to the mobile device, for example, voice calls, transmission of data (upload and/or download), short message service (SMS) services, and the like. The secondary circuitry) does not provide cellular services to the mobile device when the primary circuitry is operated. Cellular services which may potentially be provided by the secondary circuitry (e.g., voice calls, data, SMS) may be de-activated. Alternatively, the secondary circuitry may be registered with the second cellular services provider for providing the cellular services (e.g., the eSIM of the secondary circuitry is registered to a phone and/or data plan), but when acting as a secondary circuitry does not currently provide the cellular services to the mobile device; the cellular services are provided to the mobile device by the first circuitry.

It is to be understood that the terms primary circuitry and secondary circuitry refer to a state of each respective circuitry, rather to a first circuitry and a second circuitry (e.g., a first SIM and a second eSIM). The primary circuitry is not merely a first circuitry, but provides the primary cellular services to the mobile device, such as voice calls, data transmission (e.g., for accessing the internet), and/or SMS messaging. The secondary circuitry is not merely a second circuitry, and may or not provide cellular services to the mobile device. The secondary circuitry is in a "live SIM" or "live eSIM" mode, it is "turned on" as an active SIM in the device Operating System cellular settings and has connectivity to the second cellular service provider. The secondary circuitry may or may not be selected to provide cellular services.

The secondary circuitry (e.g., secondary eSIM) may be used for authentication of the mobile device by external entities, for example, by the application server for accessing the service hosted thereon. An exemplary not-necessarily limiting authentication process is now described, but the secondary circuitry may be used for other authentication processes such as known processes, for example, using pop-ups, single-click login, token based, and the like.

An application server hosting a service is accessed by the mobile device, optionally using data services provided by the primary circuitry. A request for authentication of the mobile device is received from the application server. A unique digital identifier stored in the secondary circuitry of the mobile device is accessed. The unique digital identifier may be any unique digital identifier which is assigned to a global basis to uniquely identify mobile devices, for example, a Mobile Station International Subscriber Directory Number (MSISDN). The unique digital identifier is provided to the application server for authenticating the mobile device for accessing the service. The unique digital identifier of the secondary circuitry may be accessed and/or provided to the application server. An applet code is stored on a data storage device of the secondary circuitry. The request for authentication may trigger the applet to access and/or provide the unique digital identifiers of the secondary circuitry.

At least some embodiment described herein addresses the technical problem of authenticating a mobile device independently of a specific cellular service provider. At least some embodiment described herein improves the technology of cybersecurity by providing an improved approach for authenticating a mobile device independently of a specific cellular service provider offering the service of the first circuitry. At least some embodiment described herein improves upon prior approaches of authenticating a mobile device, in particular approaches that are tied to a specific cellular service provider.

Approaches that are dependent on a specific cellular service provider include, for example, authenticating the mobile device using a SIM card installed in the mobile device. The authentication may be based on the mobile device being authenticated for cellular communication by a cellular service provider, which requires that the SIM card be associated with the cellular service provider. This authentication approach is dependent on the specific cellular service provider that provides cellular services to the mobile device via the SIM card installed in the mobile device. If the cellular service provider is not supporting the authentication using the SIM card, the SIM card cannot be used to authenticate the mobile device. Another cellular service provider that does support authentication using the SIM card cannot simply be used. To use the other cellular service provider that does support authentication using the SIM card, the existing SIM card (of the cellular service provider that does not support authentication) needs to be replaced with another SIM card (of the cellular service provider that does support authentication).

Some existing approaches avoid the aforementioned technical problem entirely, by using approaches other than the SIM card for authentication. For example, an external hardware chip that provides security via encryption. Other examples include standard approaches such as one time passwords.

At least one embodiment described herein addresses the aforementioned technical problem, and/or improves upon the aforementioned technical field, and/or improves upon the aforementioned prior approaches, by providing a secondary circuitry (e.g., eSIM) that is used for authentication of the mobile device. The secondary circuitry is in addition to a first circuitry (e.g., SIM), where the first circuitry is used to provide cellular services to the mobile device by a first cellular service provider. The secondary circuitry may be used exclusively for authentication of the mobile device. Cellular services which may be potentially be provided via the secondary circuitry may be unselected in the mobile device settings. Using the secondary circuitry enables disconnects the feature of authentication from the cellular service provider that provides services to the first circuitry. The feature of authentication enabled via the secondary circuitry may be provided by a different provider than the cellular service provider that provides services to the first circuitry. Moreover, the secondary circuitry may be implemented as circuitry designed to store an eSIM, where the eSIM may be downloaded by the mobile device (e.g., from a central server). These embodiments enable, for example, setting up a central server from which eSIM for authentication may be downloaded to multiple mobile devices that have installed therein SIM cards from different cellular service provides. Authentication using the eSIM may be provided to any mobile device which already has installed therein a SIM card, regardless of the cellular service provider that provides services to the mobile device via the SIM card, and/or without requiring interfacing with the cellular service provider of the SIM card (e.g., to set up an agreement to enable authentication). A single cellular service provider that provides connectivity to the eSIM used for authentication may be used (optionally without activating any cellular services), rather than requiring multiple different cellular service providers that provide cellular services to the SIM card in order to allow using SIM cards from different cellular service provides for authentication.

At least one embodiment described herein addresses the aforementioned technical problem, and/or improves upon the aforementioned technical field, and/or improves upon the aforementioned prior approaches, by an authentication described herein using the unique identifier of the secondary circuity of the mobile device (e.g., eSIM) which is used to ensure that the eSIM is installed within a mobile device with a "live SIM" card that has been authenticated for cellular communication by a service provider. The validation may verify that the same eSIM card that is currently installed in the mobile device attempting to log into the application server was used during a registration process, for example, ensuring that a password used on the mobile device with SIM cannot be transferred to another mobile device with a different SIM. This helps prevent theft of passwords from the mobile device, for example, by malicious applications that obtain one time passwords (OTP) sent via SMS to the mobile device and use the OTP to steal money from the user. Alternatively, using the unique identifier of the secondary circuity (e.g., eSIM) may remove the need to use passwords entirely, providing a level of security where there is no password to steal. The verification may alternatively or additionally helps ensure that a real human user using the mobile device is behind the process of the application, and/or helps exclude automated bots (which cannot be run on a large number of mobile devices with live SIM cards, since doing so would require each bot to run on a different mobile device which cannot be done practically).

At least some embodiments described herein address the technical problem of authentication of a unique identifier, optionally MSISDN (i.e., phone number), for accessing a service hosted by a server via a communication session without linking the unique identifier (e.g., MSISDN) to the communication session, for example, as defined by the Extensible Authentication Protocol Method for Universal Mobile Telecommunications System (UMTS) Authentication and Key Agreement (EAP-AKA), which is an EAP mechanism for authentication and session key distribution using the UMTS Subscriber Identity Module (USIM). EAP-AKA is defined in RFC 4187. EAP-AKA indicates that the authentication is to be done using the MSISDN, without obtaining the MSISDN from a communication session established by the mobile device and an application server hosting a service that is being accessed by an application running on the mobile device. At least some embodiments described herein improve the technology of cybersecurity, by providing an improved approach for authentication of the unique identifier. Prior approaches use header enrichment to provide the MSISDN to downstream devices, and/or extract the MSISDN from a communication session established between a mobile device and a service server hosting a service which the mobile device is attempting to access. Such header enrichment and/or extraction of the MSISDN from the communication cannot be used by EAP-AKA. Other prior approaches use a pop-up displayed on a display of the mobile device to the user to request the MSISDN. In contrast, at least some embodiments described herein use a unique identifier (e.g., MSISDN or other unique identifier) of a secondary circuitry installed in the mobile device (e.g., eSIM). The unique identifier of the secondary circuitry is different than the unique identifier of a primary circuitry installed in the mobile device (e.g., physical SIM card) which may be used to establish the session between the mobile device and the service server. This approach disconnects the unique identifier of the secondary circuitry (e.g., MSISDN) from the unique identifier of the first circuity which is used to communicate between the mobile device and the service server. In this approach, the MSISDN used for authentication of the mobile device cannot be extracted from the communication session since the MSISDN used for authentication (of the secondary circuitry) is different than the MSISDN used for the communication session (of the first circuity). At least some embodiments described herein solve the technical problem of authentication using MSISDN according to EAP-AKA.

At least some embodiments described herein address the technical problem of authentication of a unique identifier of circuity of a mobile device (e.g., MSISDN) of a third party, without having direct access to data for authentication, which cannot be directed obtained without access to the application store and the ecosystem around it (e.g., including monitoring of applications, install numbers, statistical data, user behavior, etc.), where the application is running on the mobile device, and/or without having access to the mobile device and/or without having direct access to the operating system running on the mobile device. For example, for complying with the EAP-AKA. At least some embodiments described herein improve the technology of cybersecurity, by providing an approach for authentication of a unique identifier of circuity of a mobile device (e.g., MSISDN) of a third party, without having direct access to the mobile device and/or without having direct access to the operating system running on the mobile device. For example, for complying with the EAP-AKA. At least some embodiments described herein provide a solution to the aforementioned technical problem, and/or improve the aforementioned technology, by using an authentication server and/or applet installed on the mobile device, to provide an authentication service to a third party such as an application server, without requiring direct access to the mobile device and/or without requiring direct access to the operating system running on the mobile device. Embodiments described herein may communicate with the applet running on the mobile device to validate the unique identifier of the circuitry of the mobile device and/or use the authentication server to validate unique identifier(s) of hardware of the mobile device, which enables performing the authentication without direct access to the mobile device and/or without requiring direct access to the operating system running on the mobile device. At least some embodiments described herein may provide an independent authentication service to arbitrary application server and/or arbitrary mobile devices, for example, to third parties (e.g., arbitrary application server and/or arbitrary mobile devices). Approaches described herein (e.g., dataflows described herein which include the applet and/or authentication server) are in contrast to approaches in which access to authentication data is available, for example, when access to the application store and/or ecosystem around it and/or access to the mobile device and/or access to the operating system, is available. When the authentication data is available, the authentication may be readily done without resorting to external components such as the applet and/or authentication server described herein. It is noted that authentication data may not be directly obtainable without the user's knowledge, even when access to the authentication data is available (e.g., by direct access to the application store and/or ecosystem around it, mobile device, operating system, etc.), for example, due to privacy laws which may prohibit obtaining and/or using such data. At least some embodiments described herein may be used with systems that have direct access to the authentication data in order to comply with privacy laws.

At least some embodiments described herein separate the user of the mobile device from the unique identifier of circuitry of the mobile device, for authentication of the unique identifier of the circuitry without requiring knowledge of the user of the mobile device. In contrast, approaches that require direct access to the authentication data (e.g., to the application store and/or ecosystem around it, application store, mobile device and/or direct access to the operating system running on the mobile device) tie the user to the unique identifier, and cannot authenticate the unique identifier without knowledge of the user.

At least some embodiments described herein address the technical problem of preventing or reducing malicious activity resulting from obtaining a phone number of a mobile device from a communication session between the mobile device and a service server hosting a service to which the mobile device is attempting to log into, and/or has logged into. For example social engineering fraud where a malicious entity calls a person on their phone using a number extracted from the communication session, and asks the person to perform actions which grant the malicious entity access to sensitive data to perform malicious activities such as stealing from their bank account. At least some embodiments described herein improve the technology of cybersecurity for preventing or reducing malicious activity resulting from obtaining a phone number of a mobile device from a communication session between the mobile device and a service server hosting a service to which the mobile device is attempting to log into, and/or has logged into, by separating the MSISDN from the communication session. A malicious entity that gains improper access to the communication session cannot extract the MSISDN, since the MSISDN is not bound to the communication session.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
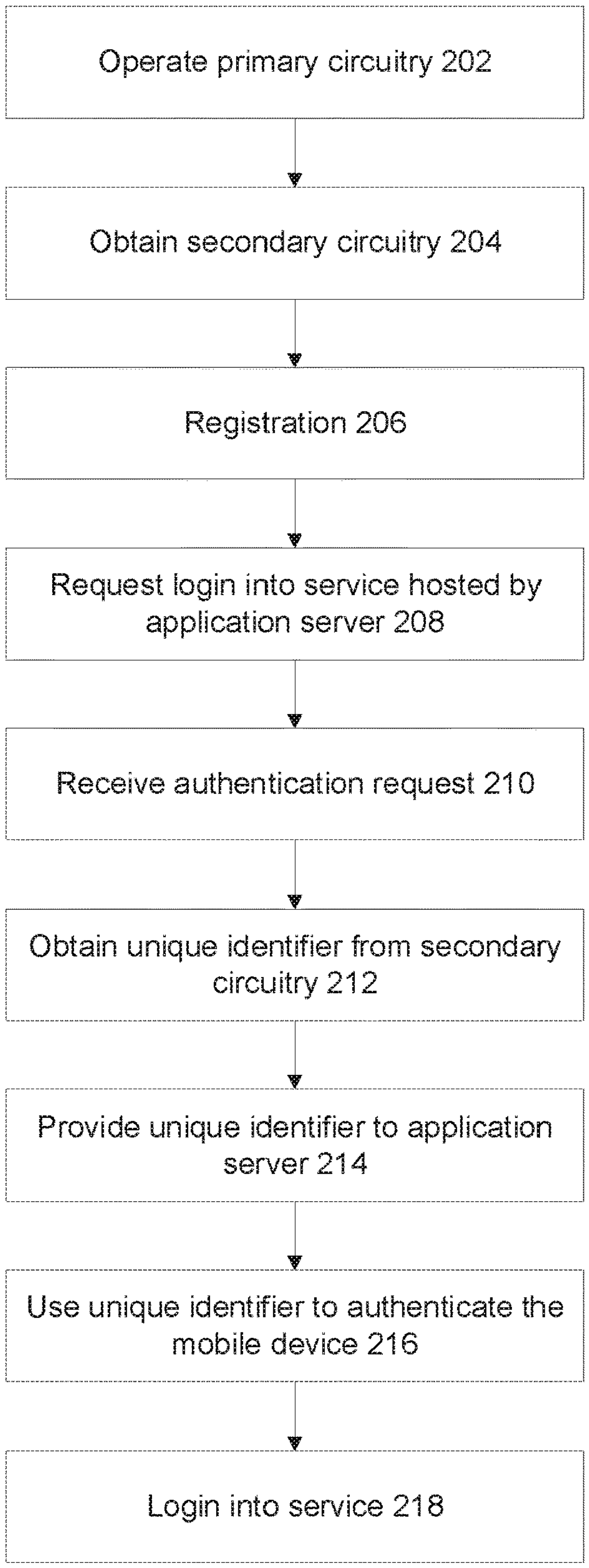
FIG. 2 is a flowchart of a method of authentication of a user and/or a mobile device for accessing a service hosted by an application server using a secondary circuitry of a mobile device, in accordance with some embodiments of the present invention.
Figure 3:
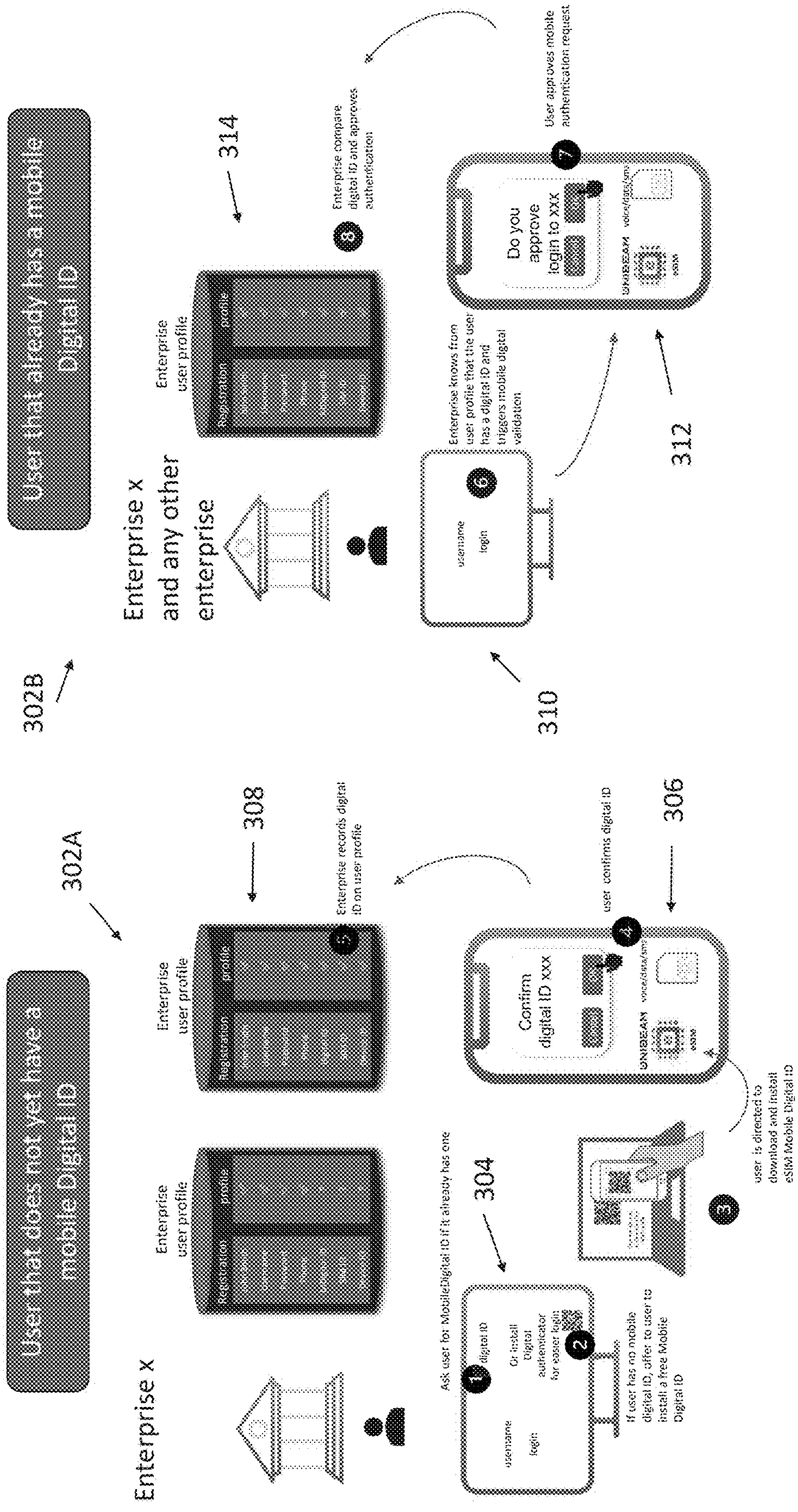
FIG. 3 includes schematics depicting exemplary flow for obtaining and/or using a unique digital identifier of a secondary circuitry of a mobile device for authentication for accessing an online service, in accordance with some embodiments of the present invention.

Reference is now made to FIG. 1, which is a block diagram of components of a system 100 for authentication of a mobile device and/or a subscriber for accessing a service 112A hosted by an application server 112 using a secondary circuitry of a mobile device 104, in accordance with some embodiments of the present invention. Reference is also made to FIG. 2, which is a flowchart of a method of authentication of a user and/or a mobile device for accessing a service hosted by an application server using a secondary circuitry of a mobile device, in accordance with some embodiments of the present invention. Reference is also made to FIG. 3, which includes schematics depicting exemplary flow for obtaining and/or using a unique digital identifier of a secondary circuitry of a mobile device for authentication for accessing an online service, in accordance with some embodiments of the present invention.

System 100 may implement the acts of the method described with reference to FIGS. 2-3 by one or more of the following components: (i) processor(s) 102 of a computing device 104 executing code instructions stored in an applet 156 which is stored on a storage device 154 of a secondary circuitry 152, (ii) a processor(s) of an eSIM server(s) 108, and (iii) a processor(s) of an application server(s) 112.

As used herein, features of methods implemented by the authentication server(s) and/or by the eSIM server(s) are to be understood as processor(s) of the eSIM server(s) and/or the application server(s) executing code.

It is to be understood that there may be an authentication server (not shown) which may perform authentication features described herein for application server 112, i.e., features described with reference to application server 112 may be implemented by the authentication server. In other embodiments, application server 112 performs the authentication features otherwise performed by the authentication server, i.e., no authentication server is implemented externally from the application server 112.

Processor(s) 102 of computing device 104 may execute application 114A, and/or code 106A, stored on a memory 106 and/or on a data storage device 114.

Computing device 104 includes a primary circuitry 150 and secondary circuitry 152.

Primary circuitry 150 may be implemented as a SIM card that is inserted into a slot of the computing device 104, and/or an eSIM card that is embedded in computing device 104. Primary circuitry 150 provides the primary cellular services for computing device 104, for example, voice calls, data transmission, SMS services, and the like.

Secondary circuitry 152 may be implemented as circuitry designed to host an eSIM and/or a physical SIM card, which is different than primary circuitry 150 (e.g. a different SIM card).

Secondary circuitry 152 may include a storage component 154 designed to store an applet 156 which may be included within code of an eSIM card and/or installed on a SIM card.

Applet 156 and/or the eSIM loaded on secondary circuitry 152 may be obtained, for example, downloaded over a network 110 from an eSIM repository 108A hosted by eSIM server 108. eSIM repository 108A may include multiple different eSIMs for download, each with a respective unique digital identifier. eSIMs from eSIM repository 108A may be supported by a cellular service provider that is different than the cellular service provider that supports primary circuitry 150 (e.g., SIM).

Applet 156 may be implemented, for example, as code instructions stored on a memory region of circuitry 152 and/or as hard-wired instructions. Applet 156 may be, for example, a program loaded into storage 154 during a download of an eSIM from eSIM server 108. In another example, code of applet 156 is pre-loaded on physical SIM cards that are provided to clients. Alternatively or additionally, applet 156 may be, for example, an existing identifier, an existing applet, and an existing code previously loaded on the circuitry 152 (e.g., hard-wired therein such as a unique identifier) and/or stored in storage 154, for example, downloaded by the mobile device from eSIM server 108.

Computing device 104 may be implemented as, for example one or more and/or combination of: a mobile device (e.g., a Smartphone, a Tablet computer, a laptop computer, a wearable computer, glasses computer, and a watch computer), user equipment (UE), mobile station (MS), a camera, a computer, internet of things (IoT) device, a cellular modem, and a cellular hotspot. Computing device 104 may refer to, for example, a group of connected devices, a single client terminal, a server, a virtual server, a computing cloud, a virtual machine, a desktop computer, a thin client, a network node, and the like.

Hardware processor(s) 102 of computing device 104 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions 106A executable by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A and/or application 114A may implement one or more features and/or acts of the method described with reference to FIGS. 2-3 when executed by hardware processor(s) 102.

Computing device 104 may include a data storage device 114 for storing data, for example, one or more applications 114A which may request login to a service 112A hosted by application server(s) 112 (e.g., payment application, online banking, online games, social network). Data storage device 114 may be implemented as, for example, a memory, a local hard-drive, virtual storage, a removable storage unit, an optical disk, a storage device, and/or as a remote server and/or computing cloud (e.g., accessed using a network connection).

Network 110 may be implemented as, for example, as one or more of: a cellular network, the internet, a local area network, a virtual network, a wireless network, a local bus, a point to point link (e.g., wired), and/or combinations of the aforementioned. Network 110 may be accessed via primary circuitry 150, and/or via another connection (e.g., Wi-Fi). In some embodiments network 110 may be accessed via secondary circuitry 152.

Computing device 104 may include a network interface 116 for connecting to network 110, for example, one or more of, a cellular interface for connecting to the cellular network (e.g., antenna), a network interface card, a wireless interface to connect to a wireless network, a physical interface for connecting to a cable for network connectivity, a virtual interface implemented in software, network communication software providing higher layers of network connectivity, and/or other implementations.

Computing device 104 may communicate over network 110 with application server(s) 112 for requesting a login to service 112A, as described herein.

Computing device 104 may communicate over network 110 with eSIM server(s) 108 for downloading an eSIM, as described herein.

Computing device 104 includes and/or is in communication with one or more physical user interfaces 120 that include a mechanism for a user to enter data (e.g., attempt to use application 114A to login to service 112A hosted by application server(s) 112) and/or view data (e.g., view indication of whether authentication was completed successfully). Exemplary user interfaces 120 include, for example, one or more of, a touchscreen, a display, a keyboard, a mouse, voice activated software using speakers and microphone, a virtual reality display (e.g., headset), and gesture activation devices.

Referring now back to FIG. 2, it is to be understood that features described with reference to FIG. 2 represent an exemplary and not necessarily limiting flow of an authentication procedure that uses a unique identifier of the secondary circuitry. The secondary circuitry may be used to provide the unique identifier for other authentication flows.

At 202, a primary circuitry installed in the mobile device is operated. The primary circuitry is operated for connecting to a first cellular service provider.

The primary circuitry may be activated for providing cellular services by the first cellular service provider to the mobile device, for example, voice call services, upload data services, download data services, and short message service (SMS) services.

The primary circuitry may be implemented as a physical SIM card, inserted into the mobile device. In another example, the primary circuitry may be implemented as an eSIM.

Optionally, the primary circuitry is used in one or more features of the method described with reference to FIG. 2, for example, for communicating with the application server, for downloading the eSIM of the second circuitry, and/or for sending the unique digital identifier obtained from the secondary circuitry.

At 204, secondary circuitry is obtained for the mobile device.

The secondary circuitry is used for authentication of the mobile device (and/or user of the mobile device), as described herein.

The secondary circuitry includes a unique identifier which is used for authentication of the mobile device. The unique identifier of the second circuitry may be implemented as a unique digital identifier when the secondary circuitry is implemented as eSIM. Examples of the unique identifier of the second circuity include, for example, a mobile station integrated services digital network (MSISDN) number, and/or another customized unique identifier, for example, a key generated by a cryptographic process.

The secondary circuitry may implemented as hardware designed for hosting an eSIM. Alternatively, in another example, the secondary circuitry may be implemented as a second physical SIM card that is inserted into the mobile device.

The eSIM (or other code instructions) may be downloaded by the mobile device, for example, from the eSIM server. The code instructions downloaded to the eSIM may provide different unique digital identifiers to different mobile devices via respective eSIMs designed for installation on the different mobile devices.

The secondary circuitry may be not selected for providing cellular services, such as voice, internet wide data, and/or user SMS. In such implementation, the secondary circuitry is still in communication with the second cellular service provider, for example, appearing as "on" by the mobile device without activation of the cellular services. Alternatively, the secondary circuitry may be activated for providing cellular services by the second cellular service provider.

The primary circuitry and secondary circuitry are implemented as separate components, installed in different locations in the mobile device, for example, different slots, a slot and a memory, and the like.

At 206, the mobile device may perform a registration process.

The registration process may be performed by communicating with an application server and/or with another server such as a registration server.

Registration may be performed in response to receiving a request from the application server for registration of the mobile device. The registration request may be provided by the application server in response to an attempt by the mobile device user to access the service hosted by the registration server, and/or in response to the mobile device user requesting registration.

The unique digital identifier of the secondary circuity is used by the application server for registration of the mobile device (and/or of the user of the mobile device). The unique identifiers of the secondary circuitry may be obtained and/or provided by the applet code running on the secondary circuitry.

It is to be understood that the unique digital identifiers of the secondary circuitry may be self-generated unique identifiers. As used herein, reference to the unique digital identifiers of the secondary circuitry which is used for authentication, for example, by being provided to the application server, may refer alternatively to or in addition to, a self-generated unique identifier computed based on the unique digital identifier of the secondary circuitry.

The self-generated unique identifier may be computed, for example, by feeding the unique data into a cryptographic process that computes a cryptographic value, and/or computed based on a combination of the unique data and metadata provided by the application fed into a hashing process. The self-generated unique identifier may be computed by an applet stored in a storage component of circuitry installed in the mobile device.

One or more other data elements may be provided by the mobile device to the application server for registration. For example:

- An application identifier (App ID) which may be created by the application running on the mobile device
- Other self-generated unique identifier (e.g., SIM ID) which may be created by the applet hosted by the circuity.

A self-generated unique number (e.g., device ID) which may be created by the applet hosted in the circuity.

At least one unique identifier of hardware of the mobile device. Examples of the unique identifier of hardware include: an Integrated Circuity Card Identification (ICCID) or Embedded Identity Document (EID which may denote a SIM ID, International Mobile Subscriber Identity (IMSI), an International Mobile Equipment Identity (IMEI) which may denote a device ID and/or Embedded Mobile Equipment Identity (EMEI) which may denote a device ID.

Name of user (i.e., real name).

Username (i.e., used for login).

Password.

One or more parameters of the mobile device (e.g., type, model, etc.).

The application server may stores the unique digital identifier and/or the other data elements in a user record, created for the mobile device (and/or user of the mobile device). It is noted that embodiments described herein may use the unique identifier of the secondary circuitry for login without necessarily requiring the other data such as name of the user, username, password, and the like, which usually are manually entered by the user. This enables a single-click login by the mobile device, for example, the user clicks a login button, and authentication is done automatically based on the unique identifier of the secondary circuity and/or other data that may be automatically extracted, without requiring the user to enter additional personal and/or sensitive data.

At 208, the mobile device attempts to login into the service hosted on the application server. The attempt to login may be performed via data sent by the first circuitry over a cellular network operated by the first cellular service provider. Alternatively or additionally, the attempt to login may be performed via data sent by the second circuitry over a cellular network operated by the second cellular service provider.

At 210, in response to the login attempt, a request for authentication of the mobile device is received by the mobile device from the application server.

At 212, in response to the request for authentication received from the application server, the unique digital identifiers stored in the secondary circuitry of the mobile device are obtained. The unique digital identifiers may be obtained by an applet stored on a storage component within the secondary circuity. The applet may be obtained by being downloaded in association with the eSIM along with the unique digital identifier, from the eSIM server. Each mobile device may download a copy of the eSIM with applet, along with its own unique digital identifier.

The unique identifier may indicate that the mobile device is authenticated from cellular communication by the second cellular service provider.

Optionally, other data is obtained. The other data may correspond to the data provided during registration. For example, as described with reference to 206 of FIG. 2.

At 214, the unique digital identifiers of the secondary circuitry and/or the other data are provided by the mobile device to the application server for authenticating the mobile device for accessing the service.

The unique digital identifier and/or other data may be sent by the mobile device to the application server via the primary circuitry over a cellular network operated by the first cellular service provider. Alternatively or additionally, the unique digital identifier and/or other data may be sent by the mobile device to the application server via the second circuitry over a cellular network operated by the second cellular service provider.

At 216, the mobile device (and/or user) may be authenticated. The authentication may be performed by the application server, and/or by another device such as an authentication server. For example, authentication may be performed by the authentication server in response to a request from the application server. The application server may communicate with the authentication server, for example, via a virtual interface, such as an application programming interface (API) and/or software development kit (SDK).

The application server may use the unique identifiers to validate that the mobile device is authenticated for cellular communication by a service provider, which is the second cellular service provider associated with the second circuitry, i.e., that the eSIM is "live".

The application server may authenticate the mobile device by comparing the unique digital identifiers received from the mobile device in response to the request for authentication, to the unique digital identifiers stored in the user record. The application server may further authenticate the mobile device by comparing other data received from the mobile device in response to the request for authentication, to the other data stored in the user record.

At 218, in response to a successful authentication, the application server (and/or authentication server) may grant the mobile device access to the service.

Referring now back to FIG. 3, schematic 302A depicts an exemplary flow for obtaining a unique digital identifiers of a secondary circuitry, in accordance with some embodiments of the present invention. Schematic 302B depicts an exemplary flow for using the unique digital identifiers of the secondary circuitry for logging into an online service with the mobile device.

With respect to schematic 302A, at 304, in response to an attempt to access a service (e.g., hosted by an application server), a user is asked either to provide a MobileDigital ID (i.e., the unique indicator of secondary circuitry) if one has previously been provided, or to install the MobileDigital ID.

At 306, the user is directed to the eSIM server to download and install an eSIM with unique identifier of secondary circuitry. The eSIM of the secondary circuity is installed on the mobile device, in addition to an existing SIM card (i.e., first circuitry) which provides cellular services to the mobile device (e.g., voice, data, SMS).

At 308, as part of the registration process, data from the mobile device is sent (e.g., to the application server) for creation of a user profile record. The data includes the unique identifier of the secondary circuity (i.e., of the eSIM). Other data that may be sent for inclusion in the user profile record include:

Unique identifier of hardware of the mobile device secondary circuitry, such as SIM ID and device ID.

Name of user (i.e., real name).

Username (i.e., used for login).

Password.

Phone (e.g., type, model, etc.).

With respect to schematic 302B, at 310, the user uses the mobile device to attempt to log into the service hosted by the application server. The application server requests the unique digital identifier of the secondary circuitry.

At 312, the user may approve sending the unique digital identifiers of the secondary circuitry to the application server as a response to the request. Other data may be sent, as described herein.

At 314, the application server may authenticate the mobile device by comparing the unique digital identifiers of the secondary circuitry and/or other data to the user profile record. The mobile device may be granted access in response to a successful match.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant circuitries will be developed and the scope of the term circuitry is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A mobile device for accessing a service hosted by an application server, comprising:

at least one processor of a mobile device executing a code for:

operating primary circuitry installed in the mobile device connected to a first cellular service provider and selected for providing cellular data services to the mobile device;

receiving, via the primary circuitry over the cellular data service operated by first cellular provider, a request for authentication of the mobile device from an application server;

accessing a unique digital identifier stored in a secondary circuitry of the mobile device having connectivity provided by a second cellular service provider; and providing, via the primary circuitry over the cellular data service operated by first cellular provider, the unique digital identifier to the application server for authenticating the mobile device for accessing the service, wherein during the operating, the receiving the request, the accessing the unique digital identifier, and the providing the unique digital identifier, the primary circuitry is activated and selected for providing cellular services by the first cellular service provider, and the secondary circuitry is in a live SIM mode or in a live eSIM mode by being active in the operating system cellular settings of the mobile device having connectivity to the second cellular service provider and the secondary circuitry is not selected to provide cellular services to the mobile device.

2. The mobile device of claim 1, wherein the unique digital identifier stored in the secondary circuitry comprises a Mobile Station International Subscriber Directory Number (MSISDN).

3. The mobile device of claim 1, wherein the primary circuitry is activated and selected for providing cellular services by the first cellular service provider, and the secondary circuitry is activated and not be selected for use by the mobile device for cellular services.

4. The mobile device of claim 1, wherein the cellular services that are activated on the primary circuitry and not selected on the secondary circuitry include at least one of: voice call services, upload data services, download data services, and short message service (SMS) services.

5. The mobile device of claim 1, wherein the primary circuitry is activated for providing cellular services by the first cellular service provider, and the secondary circuitry is activated for providing cellular services by the second cellular service provider.

6. The mobile device of claim 1, wherein the primary circuitry comprises a subscriber identifier module (SIM) card and the secondary circuitry is configured for hosting an embedded SIM (eSIM).

7. The mobile device of claim 1, wherein the primary circuitry comprises a first SIM card and the secondary circuitry comprises a second SIM card.

8. The mobile device of claim 1, wherein the primary circuitry and secondary circuitry are separate components, installed in different locations in the mobile device.

9. The mobile device of claim 1, further comprising downloading code instructions including the unique digital identifier from a server, wherein the server provides different unique digital identifiers to different mobile devices via respective code instructions configured for installation on the different mobile devices.

10. The mobile device of claim 1, wherein the primary circuitry is used for communicating with the application server and identified by the unique digital identifier assigned to the secondary circuitry.

11. The mobile device of claim 1, wherein the secondary circuitry further comprises a storage component installed in the mobile device storing an applet, wherein the applet obtains device and SIM unique digital identifiers from the secondary circuitry in response to the request.

12. The mobile device of claim 11, wherein the applet is downloaded in association with the unique digital identifier from a server providing different unique digital identifiers to different mobile devices.

13. The mobile device of claim 1, wherein the unique digital identifier indicates that the mobile device is authenticated from cellular communication by the second cellular service provider, and the application server uses the unique digital identifier to validate that the mobile device is authenticated for cellular communication by a service provider comprising the second cellular service provider.

14. The mobile device of claim 1, further comprising code for:

obtaining unique identifiers of hardware of the mobile device; and providing in association with the unique digital identifiers, at least one unique identifier of hardware to the application server for authentication of the mobile device.

15. The mobile device of claim 14, wherein the unique identifiers of hardware include self-generated identifiers that represent the Integrated Circuity Card Identification (ICCID) or Embedded Identity Document (EID), which may denote at least one of: a SIM ID and an Embedded Mobile Equipment Identity (EMEI) which may denote a device ID.

16. The mobile device of claim 1, further comprising code for:

executing an applet stored in a storage component of the secondary circuitry for accessing at least one unique identifier of hardware of the mobile device, wherein the applet obtains the unique identifier of hardware to provide to the application server.

17. The mobile device of claim 1, further comprising code for:

receiving a request from the application server for registration of the mobile device; and providing the unique digital identifier for registration of the mobile device, wherein the application server stores the unique digital identifier in a user record, wherein the application server authenticates the mobile device by comparing the unique digital identifier received in response to the request for authentication, to the unique digital identifier stored in the user record.

18. The mobile device of claim 1, further comprising code for:

receiving the request for authentication and sending the unique digital identifier, via the secondary circuitry over a cellular network operated by the secondary cellular service provider.

19. The mobile device of claim 1, wherein the secondary circuitry is used exclusively for authentication of the mobile device while the primary circuitry provides the cellular data service to the mobile device.

20. The mobile device of claim 1, wherein the secondary circuitry providing an authentication feature using the unique digital identifier disconnects the authentication features from the first cellular provider that provides the cellular data service to the first circuitry, wherein the authentication feature is provided by a second cellular provider that is different than the first cellular provider.

21. The mobile device of claim 1, wherein the unique identifier of the secondary circuitry is different than a unique identifier of the primary circuitry.

22. The mobile device of claim 1, wherein the secondary circuitry is not selected from providing cellular services to the mobile device and appears as "on" by the mobile device without activation of the cellular services.

23. The mobile device of claim 1, wherein the secondary circuitry is activated and not selected for providing cellular services to the mobile device, and wherein the secondary circuitry is configured to invoke authentication-related operations as if the authentication-related operations are initiated by the active primary circuitry providing the cellular data services.

24. The mobile device of claim 23, wherein the authentication-related operations comprise modem-level operations executable by a modem of the mobile device, wherein the modem performs these operations in response to execution of an applet stored in the secondary circuitry.

25. The mobile device of claim 23, wherein the authentication-related operations are executed without switching from the primary circuitry to the secondary circuitry.

26. The mobile device of claim 1, wherein the accessing is performed without switching from the primary circuitry to the secondary circuitry.

27. The mobile device of claim 1, wherein the secondary circuitry is inaccessible for providing cellular services while the primary circuitry is operating for providing cellular data services.

28. The mobile device of claim 1, wherein the secondary circuitry is configured to invoke a modem of the mobile device for authentication-related operations while the operating system of the mobile device remains configured to use the primary circuitry for cellular data services.

29. The mobile device of claim 1, wherein during the operating, the receiving the request, the accessing the unique digital identifier, and the providing the unique digital identifier, no operating system level switching is performed between the primary circuitry and the secondary circuitry.

30. The mobile device of claim 1, wherein during the operating, the receiving the request, the accessing the unique digital identifier, and the providing the unique digital identifier, the primary circuitry remains selected for providing cellular data services and a modem of the mobile device is configured for accessing and operating with the secondary circuitry for performing authentication-related operations.

31. The mobile device of claim 1, wherein modem-level authentication operations are implemented by the secondary circuitry independently from an operating system cellular service selection state.

32. The mobile device of claim 1, further comprising code for:

attempting, via data sent by the first circuitry, to login to the service hosted by the application server;

wherein in response to the login attempt, the application server generates a user authentication request for sending to an authentication server, and in response to receiving the user authentication request the authentication server generates a second request for authentication of the mobile device;

receiving, via the secondary circuitry bypassing the primary circuitry, the second request for authentication of the mobile device from the authentication server; and providing, via the secondary circuitry bypassing the primary circuitry, the unique digital identifier to the authentication server, wherein during the attempting, the receiving the second request, and the providing the unique digital identifier, the primary circuitry is activated and selected for providing cellular services by the first cellular service provider, and the secondary circuitry is in a live SIM mode or in a live eSIM mode by being active in the operating system cellular settings of the mobile device having connectivity to the second cellular service provider and the secondary circuitry is not selected to provide cellular services to the mobile device.

33. The mobile device of claim 32, wherein the application server is implemented as an application hosted by the mobile device, and the user authentication request is generated by the application hosted by the mobile device and provided to the authentication server via the primary circuitry.

34. A method for using a mobile device for accessing a service hosted by an application server, comprising:

at least one processor of a mobile device executing a code for:

operating primary circuitry installed in the mobile device connected to a first cellular service provider and selected for providing cellular data services to the mobile device;

receiving, via the primary circuitry over the cellular data service operated by first cellular provider, a request for authentication of the mobile device from an application server;

accessing unique digital identifiers stored in a secondary circuitry of the mobile device having connectivity provided by a second cellular service provider; and providing, via the primary circuitry over the cellular data service operated by first cellular provider, the unique digital identifiers to the application server for authenticating the mobile device for accessing the service, wherein during the operating, the receiving the request, the accessing the unique digital identifier, and the providing the unique digital identifier, the primary circuitry is activated and selected for providing cellular services by the first cellular service provider, and the secondary circuitry is in a live SIM mode or in a live eSIM mode by being active in the operating system cellular settings of the mobile device having connectivity to the second cellular service provider and the secondary circuitry is not selected to provide cellular services to the mobile device.

35. A mobile device for accessing a service hosted by an application server, comprising:

at least one processor of a mobile device executing a code for:

operating primary circuitry installed in the mobile device connected to a first cellular service provider and selected for providing cellular data services to the mobile device;

attempting, via data sent by the first circuitry over a cellular network operated by the first cellular service provider, to login to the service hosted by the application server;

wherein in response to the login attempt, the application server generates a user authentication request for sending to an authentication server, and in response to receiving the user authentication request the authentication server generates a request for authentication of the mobile device;

receiving, via a secondary circuitry bypassing the primary circuitry, the request for authentication of the mobile device from the authentication server;

accessing a unique digital identifier stored in the secondary circuitry, wherein the secondary circuitry is installed in the mobile device and the secondary circuitry has connectivity provided by a second cellular service provider; and providing, via the secondary circuitry bypassing the primary circuitry, the unique digital identifier to the authentication server for authenticating the mobile device for accessing the service, wherein during the operating the primary circuitry, the attempting, the receiving the request, the accessing the unique digital identifier, and the providing the unique digital identifier, the primary circuitry is activated and selected for providing cellular services by the first cellular service provider, and the secondary circuitry is in a live SIM mode or in a live eSIM mode by being active in the operating system cellular settings of the mobile device having connectivity to the second cellular service provider and the secondary circuitry is not selected to provide cellular services to the mobile device.

* * * * *